L. J. CAMPBELL.
TIRE.
APPLICATION FILED NOV. 20, 1914.
1,254,576.
Patented Jan. 22, 1918.
2 SHEETS—SHEET 1.
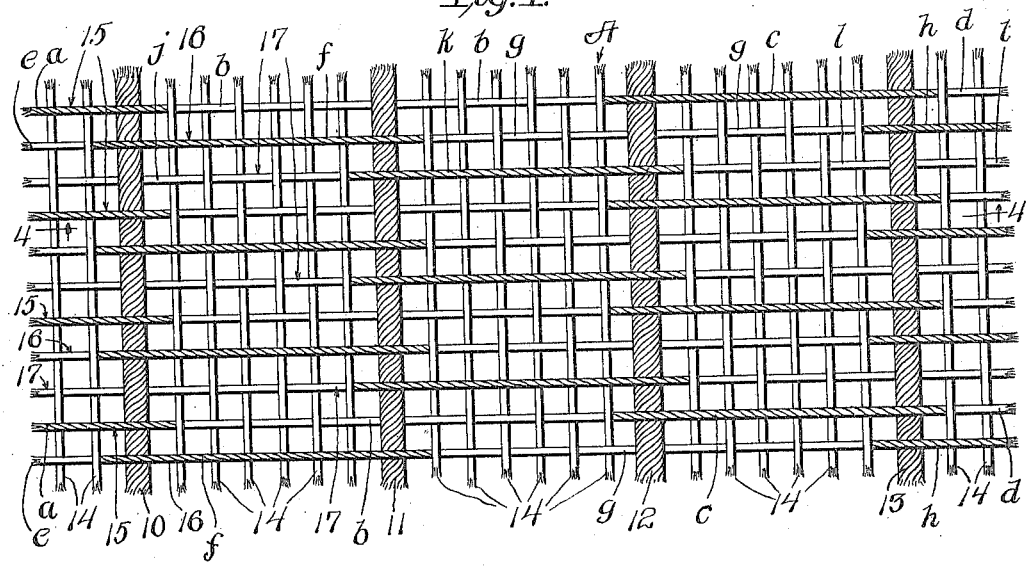
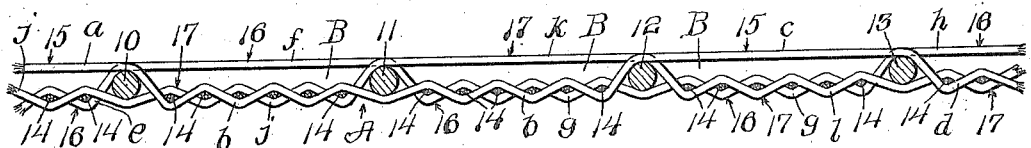
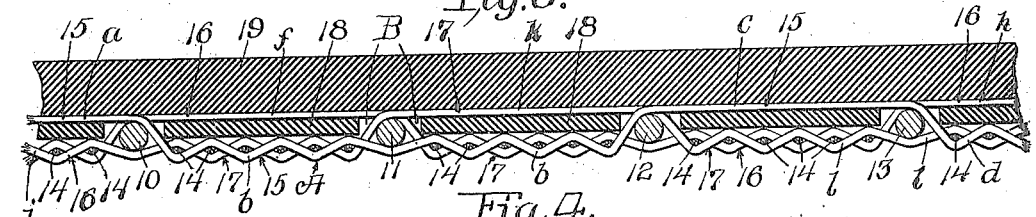
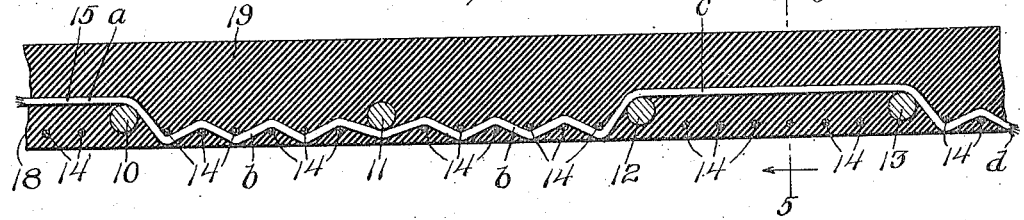
Witnesses:
Inventor:
Leon J. Campbell
by Poole & Curner
Attys.

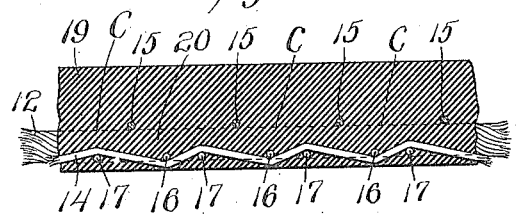
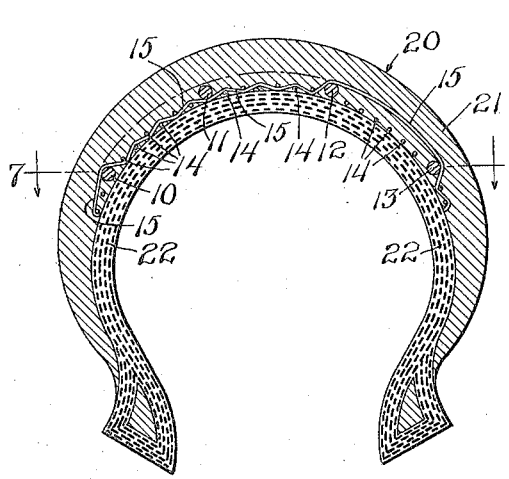
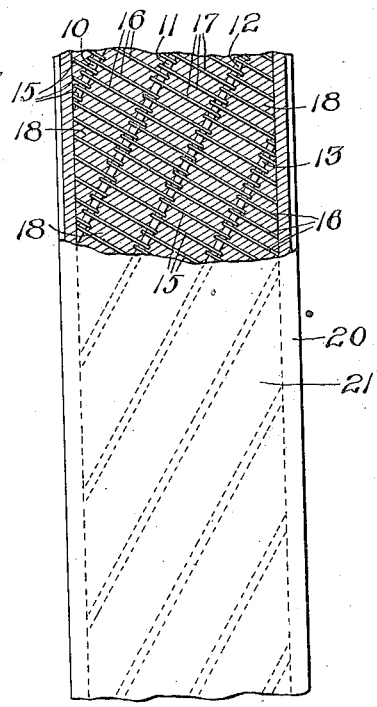

UNITED STATES PATENT OFFICE.

LEON JAY CAMPBELL, OF CHICAGO, ILLINOIS.

TIRE.

1,254,576. Specification of Letters Patent. Patented Jan. 22, 1918.

Original application filed May 25, 1914, Serial No. 840,677. Divided and this application filed November 20, 1914. Serial No. 873,080.

*To all whom it may concern:*

Be it known that I, LEON J. CAMPBELL, a citizen of the United States, and a resident of Chicago, in the county of Cook and State of Illinois, have invented certain new and useful Improvements in Tires; and I do hereby declare that the following is a full, clear, and exact description thereof, reference being had to the accompanying drawings, and to the letters of reference marked thereon, which form a part of this specification.

This invention relates to vehicle tires and more particularly to that type of tires known as pneumatic tires.

Pneumatic tires comprise an outer casing which in general embraces an inner fabric lining and an outer rubber tread, the latter being secured to said inner lining by means of an adhesive material. Such tires are called upon to support exceedingly heavy loads and the rubber treads thereof are subjected not only to the propelling strains but also to severe flexing strains in the travel of the tires over the road way. Under such strains, the rubber treads flex in all directions and by reason of such flexure, said rubber treads tend to pull away and become separated from the inner lining, with the result that the rubber treads are stripped from the inner lining in the use of the tires.

Among the objects of my invention is to improve the construction of tires of the kind referred to in the several particulars as will hereinafter appear and to provide in particular a fabric, adapted to be interposed between the rubber tread and inner lining of the tire, such fabric being secured to the inner lining and serving to connect the rubber tread with said inner lining. The fabric permits the rubber tread to yield in all directions under the propelling and flexing strains without affecting the connection of the rubber tread with the fabric and therefore, without affecting the connection of the fabric with the inner lining. The fabric holds the tread thereto and prevents the tread and lining from separating and thereby prevents the tread from being stripped from said lining in the travel of the tire over the roadway.

This invention consists further in the matters hereinafter described and more particularly pointed out in the appended claim.

In the accompanying drawings:

Figure 1 is a top plan view on an exaggerated scale of a portion of the fabric woven in accordance with my invention;

Fig. 2 is an edge view on a like scale of the fabric shown in Fig. 1;

Fig. 3 is a similar view of the fabric showing the same and the rubber parts which constitute the outer rubber casing and tread of the tire assembled before the rubber parts and fabric are united by vulcanizing such rubber parts;

Fig. 4 is a sectional view taken on line 4—4 of Fig. 1 and showing the rubber parts and fabric united after the rubber parts have been vulcanized;

Fig. 5 is a fragmentary sectional view taken on line 5—5 of Fig. 4;

Fig. 6 is a vertical or cross-sectional view of an outer casing of a pneumatic tire, showing a fabric woven in accordance with my invention applied as a breaker strip and interposed between and securing the rubber tread to the fabric lining of said tire casing; and Fig. 7 is a sectional view taken on the curved line 7—7 of Fig. 6.

Referring to the drawings, I have shown in Fig. 1 thereof on an exaggerated scale, a portion of a fabric woven in accordance with my invention. As shown, said fabric A is composed of a plurality of parallel laterally separated stout, or relatively thick, threads 10, 11, 12, 13. As illustrated, said stout threads are spaced equal distances apart and are larger in diameter than the other threads of the fabric. Between each of said stout threads are arranged a plurality of threads 14, 14 preferably parallel to each other and to said stout threads. Said threads 14, 14 are smaller in diameter than said stout threads and are arranged in the same plane as the bottoms of the latter. Interwoven with said threads 14, 14 to form the body of the fabric are a plurality of preferably parallel threads 15, 16, 17, the latter being also interwoven with the said stout threads in the manner presently to be described, so as to secure said stout threads to the body of the fabric. Said stout threads 10 to 13, being larger in diameter than the other threads, 14 to 17, the stout threads project above the plane of the body of the fabric or to one side thereof. In the fabric A shown, the threads 14, 14 extend longitudinally of the fabric and are, therefore, the warp threads. The threads 15, 16, 17 extend transversely across the fabric or the warp threads and are, therefore, the woof threads.

The cross or woof threads, 15, 16, 17 are interwoven with the stout and warp threads in the following manner:

The woof or cross thread 15 extends the full width of the body of the fabric and that portion of the woof thread 15 to the left of the stout thread 10, is picked up and constitutes a loop $a$ extending between the stout thread 10 and the stout thread (not shown) to the left thereof. Said loop $a$ extends above and across all of the warp threads 14, 14 between the stout threads just mentioned. The space formed between the loop $a$ and the body of the fabric therebelow is adapted to receive a filling of rubber which may be in the form of a strip or block to be hereinafter referred to. One end of said loop $a$, namely the right hand end thereof, passes from over the top of said stout thread 10 down and around the right side thereof and under the warp thread 14 immediately to the right of said stout thread 10 and continues into a portion $b$ extending between and below the tops of the next two stout threads 11, 12. Said portion $b$ is interwoven with the warp threads 14, 14 between said stout threads 11, 12. (See Fig. 2.) Said portion $b$ passes under the said stout thread 11, as best shown in Fig. 2. The woof thread 15 then extends upwardly from under the warp thread 14 immediately to the left of the stout thread 12 and passes over the top of said stout thread 12 and extends between the latter and the stout thread 13 to the right thereof. This portion of the woof thread 15 forms another loop $c$, the latter being above and extending across all of the warp threads 14, 14 between said stout threads 12 and 13. As in the case of the loop $a$, the loop $c$ forms a space between the same and the body of the fabric therebelow. One end of said loop $c$, to wit, the right hand end thereof, passes down and about the stout thread 13 to the right thereof and under the warp thread 14 immediately to the right of said stout thread 13. The loop $c$ continues into a portion $d$, the latter being interwoven with the remaining warp threads between the two stout threads (not shown) to the right of the said stout thread 13 as in the case of the portion $b$ of the woof thread 15. The woof or cross thread 15 is thus interwoven throughout the width of the fabric and has a loop portion raised above the body of the fabric between every three stout threads.

The next cross or woof thread 16 has a portion $e$ thereof interwoven with those warp threads 14, 14 between the two stout threads (not shown) to the left of the said stout thread 10. Said portion $e$ is thus interwoven with those warp threads 14, 14 over which the loop $a$ of said woof thread 15 extends. Said woof thread 16 extends upwardly from under the warp thread 14 immediately to the left of the stout thread 10 and then passes in the form of a loop $f$ over and between the stout threads 10 and 11. Said loop $f$ extends across and above all of the warp threads 14, 14 between said stout threads 10 and 11 with the portion $b$ of said woof thread 15 interwoven with the warp threads therebelow. Said loop or pick $f$ passes from over the top of the stout thread 11, downwardly about the right side thereof and under the warp thread 14 immediately to the right of the latter and is interwoven with the warp threads 14, 14 between said stout thread 11 and the next two stout threads 12, 13 to the right of said stout thread 11. Such portion of said woof thread 16 is indicated by $g$, and extends under the stout thread 12 and is interwoven with the warp threads 14, 14 across and above which the loop $c$ of the woof thread 15 extends. Said part $g$ extends upwardly from under the warp thread 14 immediately to the left of the stout thread 13, over the top of the same and extends in the form of a loop $h$ between said stout thread 13 and the stout thread (not shown) to the right thereof. Said loop $h$ extends above and across all of the warp threads 14, 14 between the stout thread 13 and the one to the right thereof and with which the portion $d$ of said woof thread 15 is interwoven.

The next woof thread 17 also extends the full width of the fabric and its portion $j$ is interwoven with the warp threads 14, 14 between the stout threads 10 and 11 and the one (not shown) to the left of said stout thread 10. Said portion $j$ is interwoven with the warp threads across and above which the loop $f$ of the woof thread 16 extends. The portion $b$ of the woof thread 15 and the portion $j$ of the woof thread 17 are interwoven with the warp threads 14, 14 between the stout threads 10, 11 and such portions together with said warp threads form the body of the fabric below the loop $f$ of the cross thread 16. Such portion $j$ extends upwardly from under the warp thread 14 immediately to the left of the stout thread 11, over the top of the latter and forms a loop $k$ which extends between the stout threads 11 and 12 and above and across all of the warp threads 14, 14 between said stout threads 11, 12. The non-raised portions $b$ and $g$ of said woof threads 15, 16, respectively, are interwoven with the warp threads across and above which said loop $k$ extends and the portions $b$, $g$ form with said warp threads, the body of the fabric below said loop $k$. Said loop $k$ extends down around to the right of said stout thread 12 and under the warp 14 immediately to the right thereof and continues into the portion $l$ interwoven with the warp threads 14, 14 between said stout threads 12 and 13 and the stout thread (not shown) immediately to the right thereof. As shown, said portion $l$ extends under the stout thread 13. The portion $l$ and said portion $g$ of said woof threads 16, 17, respectively, form with the warp threads 14, 14 between said stout threads 12, 13 the body of the fabric below said loop $c$ of said cross thread 15.

The next woof or cross thread is interwoven with the warp and stout threads in the same manner as the cross thread 15, and the next two woof threads follow the same path as the two woof or cross threads 16 and 17. In other words, every third woof or cross thread is interwoven in the same manner as the third woof thread preceding.

From the above it will be clear, that the set of woof threads are arranged in series, each series comprising three woof threads 15, 16 and 17 respectively, and each thread of each series is interwoven in the same manner as the corresponding thread in each series. Each woof thread is interwoven with the warp threads 14, 14 between each three consecutive stout threads to form with the warp threads between said three stout threads, the body of the fabric. Each woof thread has a loop or raised portion picked up above the body of the fabric and extending between two stout threads. The body of the fabric below each loop is formed by portions of two adjacent woof threads being interwoven with the warp threads over which said loop extends. The loops are out of contact with the warp and interwoven portions of the adjacent two woof threads and each set of loops between each two stout threads form a channel adapted to be filled with rubber in the manufacture of the tire. For instance, the loop $c$ of every third woof or cross thread 15 extends between the same two stout threads 12, 13 and over and out of contact with the warp threads 14, 14 between said stout threads 12 and 13. The portions $g$, $l$, of the other two adjacent cross threads 16, 17 are interwoven with said warp threads between said stout threads 12, 13 and form therewith the body of the fabric below said series of loops $c$. The same is true of the other series of loops of the woof threads. The fabric may be woven with the woof and warp threads close together or in contact with each other so as to give the body of the fabric an effect of being one continuous woven sheet or layer. It is of course to be understood that the body of the fabric may be closely or loosely woven according to which is desired and which will best meet the conditions under which the fabric is to be used. The loops are preferably close together and form in effect a layer of loops above the body of the fabric with a series of longitudinal channels B, B below said loops and between the stout threads. The loops passing over the stout threads, the latter serve to hold the loops above the body of the fabric. At the sides of the fabric, the ends of the alternate warp threads are joined so that said warp threads may be made of one continuous thread. The same is also true of said stout threads. The loops are separated by the portions of the adjacent woof threads interwoven with the warp threads over which said loops extend. The loops of each row are, therefore, separated one from the other laterally, as best shown in Fig. 7. The fabric above described and shown herein, constitutes the subject-matter of my co-pending application, Serial No. 840,677 filed May 25, 1914, and of which this application is a divisional application.

A fabric woven in the manner as above described and shown in the drawings, is used in the manufacture of tires in the following manner: Each channel B, B is filled with rubber indicated by 18, 18 (see Fig. 3.) Each rubber filling 18, 18 substantially fills the channel B, B. The series of loops $a$, $f$, $k$, $c$, $h$, extend across and above said rubber fillings 18, 18 and the latter are supported by the body of the fabric below said series of loops. A sheet of rubber 19, of such length and thickness as to form the outer rubber part and tread of the tire is placed flatwise upon the series of loops, as shown in Fig. 3. Said tread sheet 19 is supported above the body of the fabric by the stout threads and the series of loops, the latter being interposed or located between the tread strip 19 and the rubber fillings 18, 18. After the parts are assembled as shown in Fig. 3, the fabric and rubber parts 18, 18 and 19 are subjected to a sufficient heat so as to vulcanize the rubber and cause the rubber tread 19 and the rubber fillings 18, 18 to unite as one and envelop the series of loops and stout threads, as best shown in Figs. 4 and 5. The rubber fillings 18, 18 soften and completely fill the channels B, B and envelop the stout threads. The rubber also fills the interstices between the interwoven woof and warp threads of the body of the fabric and the latter becomes in effect embedded in the rubber portion of the tire with the outer surface of the fabric body forming the inner bearing surface of the rubber tread. The stout threads project above the body of the fabric, and form in effect oppositely facing shoulders at each side of the channels B, B. The portions of the rubber in said channels abut against said shoulders and the latter serve to prevent lateral shifting or displacement of the tread under the transverse strains to which the tread is subjected in the travel of the tire over the roadway. Portions of the rubber joining the tread strip 19 and the filler portions 18, 18 extend through the spaces or slots between the loops of each series of loops and form tongues C, C of rubber connecting such rubber parts as shown in Fig. 5. Said Fig. 5 is a view on an exaggerated scale and illustrates a series of loops of woof threads 15, 15. As said Fig. 5 is on an exaggerated scale, the loops are shown as being spaced apart laterally from one another a considerable distance, but in actual practice said loops will be much closer together, and the rubber tongues C, C will be much narrower than is shown in said Fig. 5. Said loops of the woof threads being embedded in the rubber tread and extending therethrough, as shown, serve as an additional means to hold the tread to the fabric A and act to prevent the rubber tread from being pulled away or being stripped from said fabric A. Before vulcanizing the rubber to the fabric A, the latter is united to the upper or outer surface of the inner canvas casing or lining of a tire with the loops uppermost. The rubber tongues C, C, between each of the loops $a, f, k, c, h$ of each series permit the body of the rubber tread to yield in all directions without affecting the connection of the tread with said fabric A because such yielding takes place above the body of the fabric A. As a consequence, the means joining or connecting the body of the fabric A with the inner canvas lining of the tire is free from such flexing strains and the fabric A will not be pulled or severed from the lining of the tire. By permitting the rubber tread to yield in all directions above the body of the fabric, the connection of the fabric with the tire lining is relieved of strains, and it follows, that said rubber tread does not become separated from the tire lining and become stripped from the tire in the travel of the latter over the roadway, as is the case of tires wherein the rubber tread is directly cemented to the lining. The rubber tread being secured to the tire lining by said fabric A, said rubber tread is anchored to the tire lining and the separation of the rubber tread from the tire lining under the severe flexing and propelling strains to which the rubber tread is subjected in the travel of the tire over the the roadway is prevented. The series of loops of the woof threads, in addition to performing the function stated, also serve to resist the degree of lateral flexing of the rubber tongues C, C between the loops and thus relieve the portions of the rubber tread in the channels B, B of strains and the like.

In said Fig. 6, I have shown my improved fabric applied to the outer casing of a pneumatic tire 20. Said fabric is interposed between the rubber tread 21 and the inner canvas casing or lining 22 of said tire for securing the rubber tread to said lining. As is usual in tire casings of this character, the lining 22 comprises a plurality of united superposed layers of canvas or the like, the lateral marginal portions of which envelop or inclose the metal or like clencher core pieces 23, 23. My fabric, woven as above described and shown, before being applied to the tire, is cut on the bias and to such width as to cover substantially the tread portion of the tire. Said fabric A is secured to said casing 22 by cement or otherwise before the rubber tread 21 is applied thereto. The rubber fillings 18, 18 are then inserted in the channels B, B in the manner above described, and the rubber forming the rubber tread 21 is placed over the fabric A and fillings 18, 18 and united to the latter by vulcanizing such rubber parts. The rubber tread 21 and rubber fillings 18, 18 unite and form the tread of the tire. The fabric A is thus embedded in said rubber tread. Said fabric A permanently secures the rubber tread 21 to the lining 22, and loosening of the rubber tread from the lining, and stripping of the tread from the tire or lining is prevented. Said fabric A as shown in said Fig. 5 is in the form of a breaker strip, but it is, of course, understood that the same may be cut to such width as to completely surround the canvas lining 22 and hold all portions of the rubber tread to said lining. When the fabric A is employed as a breaker strip, as shown in Fig. 5, the portions of the tread 21 on opposite sides of said breaker strip are connected to the bearing surface of the lining 22 on opposite sides of said breaker strip.

By securing the rubber tread 21 to the lining or canvas casing 22 by means of my fabric, said rubber tread 21 is permanently secured to the lining and prevented from being stripped from the latter in the travel of the tire over the roadway. The tongues of rubber C, C between each of the loops of each series of loops, unite the rubber tread 21 and rubber fillings 18, 18 in the channels and permit the tread to yield in all directions under the strains to which the same is subjected without affecting the connection of the fabric with the lining 22. The fabric A being cut on the bias, the same may be readily curved to conform to the transverse contour of the tire without bulging at any point in its length or width. Moreover, the fabric A being cut on the bias, the stout and warp threads 14, 14 extend diagonally across the tire in one direction. As such threads are secured to the canvas lining at each side of the fabric, should one thread break, the other threads crossing the same will hold. In Fig. 7 is shown, on a slightly exaggerated scale, the positions of the threads when the fabric is cut on the bias and applied to the tire.

An advantage gained in securing the rubber tread to the inner canvas lining of the tire by means of a fabric A woven as herein described resides in the fact that the rubber tread may yield in all directions under the severe flexing and propelling to which said rubber tread is subjected in the travel of the tire over the roadway, without affecting or causing any material strain or pull to be exerted on the points of connection of the rubber tread with the inner canvas lining of the tire and thereby preventing the separation and stripping of the rubber tread from said tire lining. Moreover, by reason of the stout threads and loops, the outer surface of the fabric A is in effect broken or corrugated and the holding surface of the same is increased. Furthermore, the ends of each loop being interwoven with a plurality of warp threads, the woof threads are securely held in the body of the fabric and should any one loop break, such broken thread will not be pulled out from the fabric body. As each woof thread embraces a plurality of loops, should one loop break, the remaining loops would still efficiently serve their purpose due to the fact that the portion of each woof thread between each loop thereof is tightly interwoven in the body of the fabric A on each side of the loop.

The fabric herein described, comprises in effect two layers, one of which is formed of interwoven woof and warp threads, and the other formed of a plurality of laterally separated loops. With a fabric so devised, the layer of loops extends through the rubber tread between the upper and lower surfaces thereof and said layer of loops serve to hold the rubber tread to the inner casing lining of the tire.

Although I have shown and described my improved fabric as being interposed between the outer rubber portion or tread and the inner canvas lining of a tire, it is to be of course understood that I may dispense with the inner canvas lining and use in place thereof one or several layers of my fabric. In such case the rubber fillings 18, 18, are used, and, when the rubber parts are vulcanized, the several layers of my fabric are united together, and the outer rubber portion of the tire is anchored to the fabric layers.

Although I have shown and described one specific way in which my fabric may be woven and applied to a tire, yet it is to be understood that the specific manner in which the threads are interwoven, and the specific manner in which the fabric is applied to the tire may be variously changed and modified without departing from the spirit or scope of my invention, and I do not wish to be limited to the exact details of the weave of the fabric, or the exact manner in which the same is applied, except as pointed out in the appended claim.

I claim as my invention:

A tire, composed of rubber, and a fabric, the latter comprising a body consisting of interwoven warp and woof threads, and a plurality of laterally spaced, relatively stout threads, the latter projecting above the body of the fabric and being embedded in the rubber of the tire.

In testimony, that I claim the foregoing as my invention I affix my signature in the presence of two witnesses, this 17th day of November A. D. 1914.

LEON JAY CAMPBELL.

Witnesses:
EUGENE C. WANN,
LILLIAN HEDBERG.

Copies of this patent may be obtained for five cents each, by addressing the "Commissioner of Patents, Washington, D. C."